United States Patent Office 3,828,077
Patented Aug. 6, 1974

3,828,077
PRODUCTION OF 2,3-DIHYDROFURAN
Gerhard P. Nowack and Marvin M. Johnson, Bartlesville, Okla., assignors to Phillips Petroleum Company
No Drawing. Filed Aug. 27, 1971, Ser. No. 175,704
Int. Cl. C07d 5/08
U.S. Cl. 260—346.1 R          5 Claims

ABSTRACT OF THE DISCLOSURE

Furans are selectively hydrogenated to mixtures comprising tetrahydrofuran (THF) and significant amounts of 2,3-dihydrofurans by contact with hydrogen and a ruthenium catalyst in the presence of an organic nitrogen compound which functions as a reaction modifier.

---

This invention relates to the catalytic hydrogenation of organic compounds. In accordance with another aspect, this invention relates to the partial hydrogenation of furan and alkyl-substituted furan to form significant amounts of 2,3-dihydrofurans. In accordance with a further aspect, this invention relates to the selective hydrogenation of furan and alkyl-substituted furan by contact with hydrogen and a ruthenium catalyst in the presence of selected organic nitrogen-containing compounds as reaction modifiers. In accordance with a specific aspect, this invention relates to the production of 2,3-dihydrofuran from furan by carrying out the hydrogenation in the presence of an organic nitrogen compound reaction modifier such as dimethylformamide.

In the catalytic hydrogenation of organic compounds containing two or more reducible groups, it is frequently desired to hydrogenate one or more of these groups while leaving one or more of the remaining reducible groups unhydrogenated. It is possible in some instances to achieve this end by the selection of a suitable catalyst and operating conditions.

The problem solved by the present invention is the problem of expensive and inconvenient routes for the preparation of certain unsaturated cyclic ethers. The present invention provides an alternative route to this class of chemical compounds using a process which is direct and which uses a starting material which is readily available. Furan, for example, is a starting material which is available as a by-product from oxidative conversions such as the oxidative dehydrogenation of hydrocarbons to produce more unsaturated hydrocarbons. The process is direct in that it requires just one step starting with furan.

The unsaturated cyclic ether compounds, exemplified by 2,3-dihydrofuran, are valuable initial materials for the production of polymers, pharmaceutical products, and pesticides (see U.S. 2,993,910).

In accordance with the invention, it has been found that furan and alkyl-substituted furan compounds can be partially hydrogenated to 2,3-dihydrofurans by carrying out the hydrogenation in the presence of selected organic nitrogen-containing compounds as reaction modifiers.

Accordingly, an object of this invention is to provide an improved process for the catalytic hydrogenation of organic compounds.

Another object of this invention is to provide an improved process for the prepartion of unsaturated cyclic ethers.

A further object of this invention is to provide an improved process for the production of 2,3-dihydrofurans from furan and alkyl-substituted furans.

A further object of this invention is to provide hydrogenation reaction modifiers for partially hydrogenating cyclic ethers.

Other objects and aspects as well as the several advantages of the invention will be apparent to those skilled in the art upon reading the specification and the appended claims.

In accordance with the invention, 2,3-dihydrofurans are produced in significant amounts by contacting a furan and hydrogen with a ruthenium catalyst in the presence of an organic nitrogen-containing compound which functions as a reaction modifier to selectively hydrogenate furan compounds to 2,3-dihydrofurans.

In accordance with a specific embodiment of the invention, furan or an alkyl-substituted furan compound and hydrogen are contacted with a ruthenium catalyst under hydrogenation conditions in the presence of a reaction modifying amount of at least one organic nitrogen-containing compound which functions as a modifier to partially hydrogenate the furan compound and form a 2,3-dihydrofuran as product.

In a preferred embodiment, it has been found that the formamides function effectively as reaction modifiers to selectively hydrogenate furan to a mixture of tetrahydrofuran and significant amounts of 2,3-dihydrofuran.

The starting materials for the process of the present invention are furan or alkyl derivatives of furan wherein each alkyl group, if present, contains up to 5 carbon atoms per group, and wherein not more than 15 carbon atoms are present in the total molecule. Some examples of these are furan, 1-methylfuran, 2-ethylfuran, 2-amylfuran, 1,4-dimethylfuran, 1,4-diamyl-2-methylfuran, and the like, and mixtures thereof.

The invention is catalyzed by ruthenium. The ruthenium can be in the elemental state such as in the form of a powder, colloidal dispersion, or distributed on the surface of a high surface catalytic support. Such ruthenium catalysts are known in the art and their preparation is not necessarily part of this invention. For example, a conventional catalyst support such as alumina can be impregnated with an aqueous solution of a ruthenium halide salt, and the impregnated solid can be calcined and then contacted with a reducing atmosphere such as hydrogen. A finely divided dispersion of ruthenium can be prepared by reacting a ruthenium salt with aluminum metal.

The supported ruthenium catalysts are more convenient for vapor phase operations whereas the ruthenium dispersions can be used with effectiveness in liquid phase operations. When supported ruthenium catalysts are used, such catalysts will contain, generally, from about 0.001 weight percent to about 25 weight percent Ru, preferably 0.01–2 weight percent Ru. The ruthenium can be supported on conventional catalyst supports such as silica, alumina, titania, charcoal, and the like, and mixtures thereof, as well as on other difficultly reducible refractory materials.

Before use in the reaction zone, the supported ruthenium catalysts are conventionally treated, generally by a heat treatment as well as treatments with reducing agents such as hydrogen. In some instances, it is advantageous to contact the active catalyst with a carbon monoxide-containing gas prior to use in the reaction zone.

To achieve the selective results of the process of the present invention, the reaction mixture contains at least one reaction modifier. These modifiers are nitrogen-containing materials represented by the following:

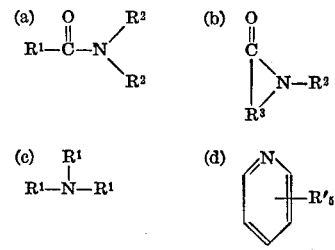

(e) 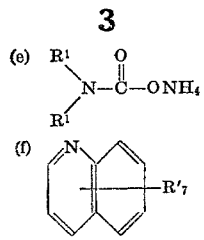

(f)

(g) mixtures of $NH_3$ and one or more of $NH_4HCO_3$, $(NH_4)_2CO_3$, and $CO_2$ wherein $R^1$ and $R^2$ are selected from hydrogen, and alkyl, arly, cycloalkyl, groups or combinations of these such as aralkyl or alkaryl, wherein $R^3$ is an alkylene radical having 2–5 carbon atoms; wherein the number of carbon atoms of compounds shown in compounds (a)–(f) does not exceed about 15; and wherein the mixture of (g) contains about 0.01–20 moles of $NH_4HCO_3$, $(NH_4)_2CO_3$, or $CO_2$ per mole of $NH_3$.

Preferably $R^1$ is hydrogen and each $R^2$ is a $C_1$–$C_4$ alkyl radical or a phenyl radical.

Referring to the above-described nitrogen-containing materials that can be employed, it is presently preferred to employ those represented by formula (a), the formamides.

Some specific examples of the above-described modifiers are N,N-dimethyl formamide, formamide, N-methyl-N-phenylformamide, benzamide, N-methylpyrrolidone, N-ethylcaprolactam, ammonia, diethylamine, pyridine, N-methyl-N-cyclohexylammonium carbamate, ammonium carbamate, quinoline, and the like, and mixtures thereof.

The invention process can be operated either batchwise or continuously at temperatures in the range of from about 100 to 500° F., preferably 200–450° F. The pressure does not appear to be critical and pressures of 0–2000 p.s.i.g. or higher can be used. In continuous processes, flow rates of 0.1–20 WHSV can be used. Any suitable mode of contact with the catalyst can be used, but fixed catalyst bed operation is presently preferred.

If desired, the furan feed can be diluted with inert diluents, and diluents such as saturated hydrocarbons, pentane, for example, can be used. Except for extremely small amounts which would obviously limit conversion, the quantity of free hydrogen in the reaction zone can be varied appreciably, depending upon other reaction variables. Hence, any convenient hydrogen rate from stoichiometric (based upon the desired extent of conversion to the desired product) to many times this level can be used. Generally, the amount of hydrogen in the reaction zone will be 0.5–6 moles of hydrogen per mole of furan compound.

The process is generally carried out by contacting the feed material with the catalyst and hydrogen under the desired operating conditions and in the presence of a reaction modifier. One convenient method of introducing the modifier is to blend it with the feedstream in amounts of 0.01–10 weight percent, preferably 0.1–5 weight percent, based upon the furan feed. On startup, it has been found that it is sometimes beneficial if relatively large amounts are used for a short period of time.

The products of the invention process will include tetrahydrofurans as well as the 2,3-dihydrofurans. Some examples of these that can be produced from the furan starting materials disclosed above include 1-methyl-2,3-dihydrofuran, 1-methyltetrahydrofuran, 2-ethyl-2,3-dihydrofuran, 2-amyltetrahydrofuran, 1,4-dimethyl-2,3-dihydrofuran, 1,4-diamyl-2-methyltetrahydrofuran, and the like. After leaving the reaction zone, these products can be separted by any convenient means such as by fractional distillation, extraction, adsorption, and the like. The desired products can be isolated and removed, while unconverted furans can be recycled.

SPECIFIC EXAMPLE

In this example, furan was converted to hydrogenated products including a substantial amount of 2,3-dihydrofuran by contact with hydrogen and with a ruthenium on alumina catalyst in the presence of dimethylformamide.

A stainless steel fixed bed reactor was charged with a granular commercial ruthenium on alumina catalyst which contained about 0.5 weight percent Ru. While maintaining the pressure of 300 p.s.i.g. and a temperature of about 288° F., a normal pentane solution containing 26.3 weight percent furan, and 2.7 weight percent dimethylformamide was passed through the reactor at a furan flow rate of 0.5 WHSV. Hydrogen was also passed through the reactor at a rate of 2000 GHSV.

The effluent from the reactor was collected and analyzed. The analysis showed that 12.1 percent of the furan had been converted. 11.4 percent of the conversion was to tetrahydrofuran while 0.75 percent of the conversion was to 2,3-dihydrofuran. The identity of dihydrofuran was established by gas-liquid chromatography, mass spectrometry, and nuclear magnetic resonance methods. In another similar run which was carried out in the absence of dimethylformamide, no product other than the tetrahydrofuran was detected.

We claim:

1. A process for the production of 2,3-dihydrofuran which comprises contacting furan and hydrogen with a ruthenium catalyst in the presence of formamide having the formula

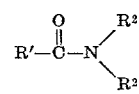

wherein $R'$ is hydrogen and $R^2$ is an alkyl radical having from 1–4 carbon atoms or a phenyl radical which formamide is present in an amount ranging from 0.01–10 weight percent based upon furan feed which is sufficient to partially hydrogenate furan to 2,3-dihydrofuran, and thereafter recovering 2,3-dihydrofuran formed in the process.

2. A process according to claim 7 wherein said contacting is effected at a temperature in the range of about 100 to about 500° F., a pressure in the range of 0–2000 p.s.i.g., and the furan is introduced to said contacting with an inert diluent.

3 A process for the production of 2,3-dihydrofuran according to claim 1 which comprises contacting a ruthenium-alumina catalyst with furan, hydrogen, and dimethylformamide is the reaction modifier 4. A process according to claim 1 wherein said contacting is carried out at a temperature in the range 200–450° F. and the amount of formamide present is in the range 0.1–5 weight percent.

5. A process according to claim 1 wherein said formamide is dimethylformamide.

References Cited

UNITED STATES PATENTS 3,177,258  4/1955  Rylander et al. __ 260—346.1 X
3,021,342  7/1962  Manly _____ 260—346.1 X

OTHER REFERENCES

Chegolya et al., Chem. Abstr. vol. 58 (1963). 9666d. Abstract of U.S.S.R. 150,491, Oct. 11, 1962.

House, Modern Synthetic Reactions, New York., W. A. Benjamin (1965), pp. 6–14.

HENRY R. JILES, Primary Examiner

B. DENTZ, Assistant Examiner